United States Patent [19]

Smith et al.

[11] 4,009,623
[45] Mar. 1, 1977

[54] FOOT LEVER CONSTRUCTION HAVING CONTROLLED FLEXIBILITY

[75] Inventors: Grover C. Smith; Thomas M. Smith, both of Houston, Tex.

[73] Assignee: Interstate Sports, Inc., Houston, Tex.

[22] Filed: Dec. 17, 1974

[21] Appl. No.: 533,700

[52] U.S. Cl. .............................. 74/512; 74/560; 74/594.1; 180/33 R

[51] Int. Cl.² ........................................ G05G 1/14

[58] Field of Search ............ 74/512, 560, 523, 543, 74/545, 484–486, 599, 594.1, 594.2, 594.3, 487, 594.4; 180/33 R; 280/290, 291

[56] References Cited

UNITED STATES PATENTS 3,733,922  5/1973  Tripp .................................. 74/523

FOREIGN PATENTS OR APPLICATIONS 619  1/1896  United Kingdom ............... 74/594.4

Primary Examiner—Benjamin W. Wyche
Assistant Examiner—Frank H. McKenzie, Jr.
Attorney, Agent, or Firm—James L. Jackson

[57] ABSTRACT

A foot lever having controlled flexibility which is formed from a yieldable material, which material incorporates internal structural elements to provide exceptional strength and controllable yielding in the vicinity of the connection of the foot lever with a shaft that is operated by the lever. The internal structural elements include an elongated structural element that allows limited bending or yielding of the yieldable material of the lever in the vicinity of the shaft connection thereof and directs any additional bending to occur toward the free extremity of the lever. Also included in the lever structure is means for vectoring impact forces to protect the lever and the lever shaft against damage in the event an object is struck by the lever as the lever controlled machine is moved.

14 Claims, 8 Drawing Figures

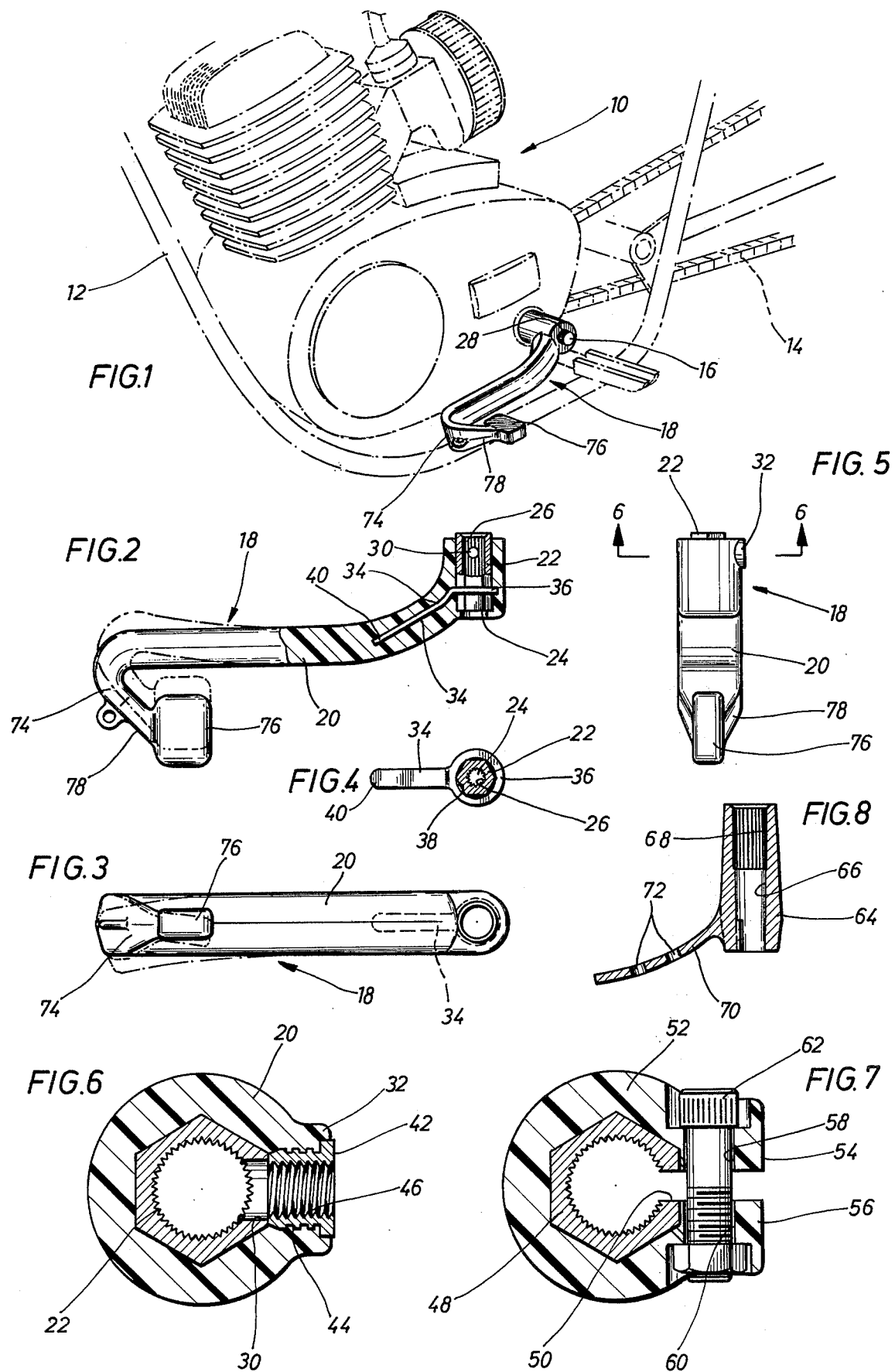

FOOT LEVER CONSTRUCTION HAVING CONTROLLED FLEXIBILITY

FIELD OF THE INVENTION

This invention relates generally to foot levers for motorcycles and the like for controlling movement of rotary operating shafts and more particularly relates to a flexible foot lever structure incorporating internal strengthening elements that allow controlled yielding of a lever body constructed of flexible material to prohibit transmission of excessive torque forces to the operating shaft. Additionally, the invention is directed specifically to the provision vectoring means provided on the lever structure which reacts against an object that might be struck by the lever as the mechanical device is moved and which causes the development of a resultant vector that substantially reduces transmission of forces to the shaft to which the lever is attached.

BACKGROUND OF THE INVENTION

In the operation of mechanical devices such as motorcycles, and especially motorcycles that are utilized under racing conditions it is frequently determined that excessive forces are applied to operating shafts such as clutch shafts, brake shafts and the like possibly due to the excessive forces that are imparted thereto during the excitement that occurs under racing conditions. There is a tendancy for the operator due to excitement to over-exert forces on the gear shift lever and such application of excessive forces to the gear shift lever may cause the gear shift lever to bend or break. Additionally, excessive loads on gear shift levers and other operating levers may cause damage to the engine casing of the motorcycle. Loads applied to the gear shift lever of motorcycles are generally transmitted to such mechanical parts as shifting forks, shifting drums, shifting pins, transmission gears and other miscellaneous parts of the gear shift mechanism, such as gear dogs, couplers, thrust washers, bushings, etc. If the gear shift lever is relatively stiff, sudden application of forces to the gear shift lever will cause a condition of impact upon the mechanical parts of the gear shift mechanism that may cause excessive wear of the mechanical parts as well as possibly causing damage thereto. For example, shifting forks, drums and pins are a frequent cause of motorcycle repair because of their susceptibility of being damaged by excessive forces being applied through the gear shift lever and also because of accelerated wearing of these parts resulting from application of excessive forces.

Another problem area that causes a considerable amount of motorcycle repair is the tendency of operating levers to become broken in the event they are impacted or in the event excessive force is applied thereto. For example, if a motorcycle should fall over either during operation or while standing still, the gear shift lever, being exposed at the side of the motorcycle may strike objects and may become broken.

If a motorcycle is moving forward and strikes an immovable object such as a rock for example, the collision with the object will typically impart a force to the gear shift lever that is substantially normal to the shaft to which the lever is connected. Shafts frequently become bent or broken in this manner and must be replaced. Accordingly, it is a primary object of the present invention to provide a novel foot lever construction for motorcycles and other similar mechanical devices that effectively resists impact forces and reduce the amount of lever breakage that would otherwise occur.

It is a further object of the present invention to provide a novel foot lever construction that provides a cushioning ability to prevent transmission of excessive forces to operating mechanisms such as the gear shift mechanism of a motorcycle or the like.

It is an even further object of the present invention to provide a novel foot lever construction for motorcycles and other mechanical devices that will not become permanently bent in the event the same are impacted against other objects.

Among the several objects of the present invention is noted the contemplation of a novel foot lever construction including internal structural supporting means that provide controlled flexibility of the lever.

It is another important feature of the present invention to provide a novel foot lever construction including means for vectoring forces that are applied to the lever in such a manner as to prevent damage to the shaft to which the lever is connected.

It is also a feature of the present invention to provide a novel foot lever structure that is yieldable upon application of forces thereto to prevent lever breakage that might otherwise occur if the lever strikes an object due to movement of the mechanism to which the lever is connected.

The present invention also comtemplates the provision of a novel foot lever construction that is of simple nature, reliable in use and low in cost.

Other and further objects, advantages and features of the present invention will become apparent to one skilled in the art upon consideration hereof. The form of the invention, which will now be described in detail, illustrates the general principles of the invention, but it is to be understood that this detailed description is not to be taken as limiting the scope of the present invention.

SUMMARY OF THE INVENTION

A preferred embodiment of the present invention may conveniently take the form of an elongated body of yieldable material formed in the configuration of a foot lever having a shaft connection extremity for connection to a shaft to be operated and having a free extremity to which force is applied by the foot of the operator to impart controlling movement to the shaft. To resist damage by impact with objects as the mechanical device is moved, the foot lever may be provided with a reverse bent free extremity portion that defines a cam surface that is angulated with respect to the typical direction travel of the mechanical device to which the lever is connected. Additionally, the lever may be formed of resilient material that will yield upon application of forces thereto, which yielding will occur as the cam surface engages the object during collision to cause flexing or bending of the lever to a position allowing the object to clear the lever. The cam surface additionally serves to limit the amount of force applied to the shaft to which the lever is connected by vectoring of impact forces causing impact forces to be vectored from a substantially normal relationship with the shaft to a vector direction that is angulated with respect to the shaft.

The body of yieldable material from which the lever is constructed may be molded about an insert of substantially rigid material which insert is adapted to be received in non-rotatable relation with an extremity of the shaft. An elongated structural element, either formed integrally with the insert or separate therefrom may be also disposed within the body of yieldable material and may terminate short of the free extremity of the lever, causing the lever to be substantially more rigid in the vicinity of the shaft connection extremity than at the free extremity thereof. The elongated structural element may have mating non-rotatable relation with the insert to establish desired structural interconnection that causes the insert and elongated structural element to be substantially integral in function.

A second insert may be retained within the molded elongated lever body and may be adapted to receive a locking element that may be manipulated to achieve locking engagement between the insert and the shaft to retain the lever in substantially locked engagement with the shaft.

BRIEF DESCRIPTION OF THE DRAWINGS

So that the manner in which the above recited features, advantages and objects of the present invention, as well as others, which will become apparent, are attained and can be understood in detail, a particular description of the invention, briefly summarized above, may be had by reference to the embodiments thereof which are illustrated in the appended drawings, which drawings form a part of this specification.

It is to be noted however that the appended drawings illustrate only typical embodiments of the invention and are therefore not to be considered limiting of its scope, for the invention may admit to other equally effective embodiments.

IN THE DRAWINGS

FIG. 1 is a broken line illustration of part of the motor, frame and drive chain structure of a typical motorcycle having a gear shift actuating shaft and showing in full line a gear shift lever constructed in accordance with the present invention.

FIG. 2 is a plan view of the gear shift lever illustrated in full line in FIG. 1 having a portion thereof broken away and shown in section.

FIG. 3 is a side view of the gear shift lever illustrated in FIGS. 1 and 2 and showing in broken line an insert and elongated structural element being disposed within the molded lever body.

FIG. 4 is a view illustrating the insert and elongated structural element shown in FIG. 2, depicting the interrelated structural relationship thereof in detail.

FIG. 5 is an end view of the lever structure of FIG. 2.

FIG. 6 is a sectional view taken along line 6—6 of FIG. 5.

FIG. 7 is a sectional view of an insert and lever tightening mechanism comprising a modified embodiment of the present invention.

FIG. 8 is a sectional view of an integrally formed insert representing a further modified embodiment of the present invention.

DESCRIPTION OF PREFERRED EMBODIMENTS

Now referring to the drawings and first to FIG. 1, there is depicted in broken line a portion of the engine 10 frame 12 and drive chain 14 of a typical motorcycle having a gear shift operating shaft 16 to which an actuating lever may be connected. It will be desirable to connect an actuating lever to the rotary shaft 16, which lever will be controllably yieldable to prevent application of excessive torque forces to the shaft. In accordance with the present invention, a shaft operating lever having controlled flexibility, as shown in full line generally at 18 in FIG. 1, may be suitably connected to the shaft 16 and may be manipulated by the foot of the operator of the mechanical device to achieve the shaft control as desired. Although the lever structure of the present invention is designed particulary for use in connection with motorcycles, it is not intended to in any way limit use of such levers to motorcycles, it being obvious that other mechanical devices may also utilize such lever structure.

Referring now to FIGS. 2–5, the lever structure illustrated generally at 18 may conveniently take the form illustrated which includes an elongated body 20 that is composed of a yieldable material such as any one of a number of suitable commercially available impact resistance plastic materials such as various nylon resin compositions and the like. The body 20 may be molded to any suitable configuration within the scope of this invention for forming a foot lever of pleasing appearance as well as functional design.

It will be desirable to provide the lever structure with suitable means for establishment of an interlocking relation with the shaft 16 of the motorcycle or other mechanical device. One suitable means for establishing such locking engagement may conveniently take the form illustrated particularly in FIG. 2, where an insert 22, composed of any one of a number of suitable commericially available metal or plastic materials, may be provided having a passage 24 formed therethrough. A part of the passage 24 may be defined by an internally knurled portion 26 that establishes a non-rotatable relationship between the insert 22 and an externally knurled portion 28 of the shaft 16. The insert 22 may also be formed to define a locking aperture 30 enabling a locking element such as a set screw supported by the plastic body 20, to extend through the aperture 30 into locking engagement with the outer periphery of the shaft 16. A boss 32 may be defined on the elongated body 20 of resilient material and the aperture 30 of the insert 22 may be disposed in alignment with the boss 32 in such manner that threads formed in the boss will be aligned with the insert aperture 30. A set screw or other locking device may be received by the threads formed in the boss 32 and may extend through the aperture 30 into locking engagement with the shaft 16.

It is also desirable to provide means for controlling the flexibility of the lever 18 to insure that the lever has maximum strength in the area of connection with the shaft 16 and to allow controlled flexing of the lever to occur toward the free extremity of the lever structure. One means for accomplishing controlled flexibility of the lever structure 18 may conveniently take the form illustrated in FIGS. 2 and 4 and shown in broken line in FIG. 3. An elongated structural element, composed of any one of a number of suitable commercially available metal or plastic materials having good structural integrity and being substantially more rigid than the body of yieldable material, may be disposed in non-rotatable structurally interrelated manner with the insert 22 and may also be disposed within the molded body of flexible material. As shown in FIG. 4, the elongated structural element 34 may incorporate a generally circular head portion 36 having a multi-sided opening 38 formed therein, which opening may be disposed in mating relation about the external configuration of the insert 22. For example, as shown in FIG. 4, the insert 22 is of six sided configuration which may be defined by conventional hexagonal bar stock and the multi-sided aperture 38 in the head portion 36 may be also of hexagonal configuration and may fit quite closely with the outer configuration of the insert in the manner that a wrench fits a nut to establish a non-rotatable relation therebetween. It may be desirable to manufacture the multi-sided opening 38 with an internal size that corresponds to the size of the external configuration of the insert 22, allowing the head portion 36 of the structural element 34 to be received in press fitted relation with the insert. With the elongated structural element in press fitted relation with the insert, a substantially immovable relationship is established which causes the assembled insert and structural element to have the characteristic of being integral.

It will be desirable to provide for controlled flexibility of the foot lever 18 and, according to the present invention, one suitable means for accomplishing such control flexibility may reside in the provision on the structural element of an elongated tail piece 40 that is adapted to extend toward the free extremity of the lever 18. The elongated tail portion 40 may be bent or otherwise formed in any suitable manner to correspond to the configuration of the lever 18 in the vicinity of connection of the lever to the rotatable shaft 16. Considerable strength will be added to the resilient body of material 20 in the vicinity of connection of the lever to the operating shaft and bending of the lever 18 will occur freely only in those areas beyond the free extremity of the tail piece 40. Moreover, the elongated structural element 40 may be composed of a material having different structural integrity as compared to the material from which the insert 22 is formed and the material from which the body 20 is formed. The elongated structural element 34 may in fact have a certain degree of flexibility and may be of a design that promotes controlled flexibility that makes the lever gradually more flexible from its point of connection from the shaft outward toward the free extremity thereof.

It is observed therefore that the flexibility of the material from which the body 20 is constructed will control the degree of flexibility of a major portion of a portion of the lever structure while the cooperative relationship between the flexible material and the elongated structural element will control the flexibility of the lever in the vicinity of the lever connection with the operating shaft 16. Moreover, the structural interrelation between the insert 22 and the head portion 36 of the elongated structural element 34 will insure substantial rigidity of the lever structure in the immediate vicinity of the shaft 16. The non-circular or hexagonal configuration of the insert 22 will insure the formation of a positive interlocking relationship between the molded flexible material and the insert to provide for maximum control and sensitivity of the lever structure.

With reference now to FIG. 6, the body 20 of flexible material may be formed with a boss 32 in the manner depicted in FIG. 5. Rather than forming threads in the plastic material as discussed above in connection with FIG. 5 a second insert may be retained by the flexible material of the lever and may be formed to receive a lever locking device. As shown in FIG. 6 the second insert 42 may be provided with an irregular external configuration such as illustrated at 44 that will allow the molded body 20 to establish positive retention thereof. The insert 42 may be internally threaded as shown at 46 and may receive a set screw or any other suitable externally threaded locking device that will extend through the aperture 30 into engagement with the outer periphery of the shaft 16. The set screw or other locking device received by the threads 46 merely secures the lever against linear movement relative to the shaft 16, rotary movement being prevented by the mating relationship between the external splines of the shaft and the internal spline configuration of the insert 22.

Referring now to FIG. 7, a modified embodiment of the present invention is depicted including an insert that is formed to define an elongated slot 50. As the body 52 of resilient material is molded thereabout, the slot 50 is oriented with respect to the molding die, such that opposed flanges 54 and 56 of the body structure 52 will be disposed in registry with the slot 50. Cutting an elongated slot 50 in the insert 48 will allow the internal size of the insert to be adjusted to achieve firm locking relationship between the insert and the shaft to which the insert is assembled. Apertures 58 and 60 may be formed in the flanges 54 and 56, respectively, and may be disposed in registry so as to receive a bolt and nut assembly 62 that may be appropriately manipulated to draw the flanges 54 and 56 toward one another, thereby reducing the effective internal dimension of the insert 48 and causing it to be drawn into tight interlocking engagement with the shaft about which it is received.

Referring now to FIG. 8, it is clear that the insert, together with the elongated structural element, may be formed as an integral member which may be received by the free extremity of the operating shaft. As shown in FIG. 8, an insert 64 may be provided having a passage 66 defined therein which is formed in part by an internally knurled portion 68. A lever strengthening and bending controlling portion 70 may be formed integrally with the annular insert portion 64 and may be provided with apertures 72 through which the material of the molded body 52 may flow to establish firm integral relationship between the resilient material and the material from which the insert is composed. The insert and the elongated structural element may take other suitable configurations as is desired without departing from the spirit and scope of the present invention.

It will be desirable to provide the foot lever structure 18 with means to allow inward flexing of the lever in the event an object is struck by the lever as the motorcycle or other mechanical device is moved. It will be desirable therefore to provide means for vectoring forces that are applied to the lever during striking of an object with the lever so as to effectively reduce the magnitude of forces that are transmitted to the lever and thereby protect it from being bent or otherwise damaged due to the forces developed during impact. As shown in FIGS. 2 and 3, the free extremity of the lever 18 may be defined by a reverse bent or swept back portion 74 that is disposed in angular relation to the main body portion of the lever structure. The swept back or angulated portion 74 may have a pad portion 76 disposed at the free extremity thereof, which pad portion may be engaged by the foot of the operator during manipulation of the lever structure. The swept back or angulated portion 74 may be tapered downwardly from a relatively large cross sectional configuration adjacent the main body portion of the lever to a relatively small cross sectional configuration in the vicinity of the pad portion 76.

As shown in FIG. 3, application of forces to the pad 76 during manipulation of the lever structure 18 will, because of the reducing cross sectional configuration of the swept back portion 74, cause yielding of the flexible material, thereby allowing the pad to assume a configuration such as illustrated in broken line in FIG. 3. Simultaneously, the controlled flexibility of the main body portion of the lever will allow controlled flexing to occur, which coordinated controlled flexing will prevent excessive rotational forces from being applied to the shaft 16. Further, if forces of quite large magnitude are developed, the elongated structural element 34 may yield to some extent, thereby further providing for controlled flexibility of the lever structure.

The swept back portion 74 of the lever structure may define a cam surface 78 at the forward surface portion thereof the lever structure. The cam surface 78 will effectively provide a reaction surface that, upon engagement between the cam surface 78 and an object as the motorcycle or other mechanical device moves forward, will develop a force vector that urges the lever body inwardly in the manner shown in broken line in FIG. 2. The reaction between the cam surface 78 and an object may allow the object to yield the flexible portion of the lever to such extent that the object will pass the lever without applying substantial forces through the lever structure to the shaft 16. This feature will prevent the shaft 16 from being damaged unless the impact force on the cam surface 78 is sufficiently great to result in a force vector that overcomes the restraining ability of the shaft 16. Ordinarily, motorcycles are provided with safety bars that are disposed immediately forward of gear shift levers and other mechanical lever structures and which serves to protect such levers against being damaged due to impact with objects. Safety bars or the like would prevent the lever of the present invention from being struck on the curved part of the reverse bent portion thereby protecting the lever structure against impact with objects on all but the swept back portion thereof and the swept back portion, as indicated above, will react due to impact forces to modify the force vector of impact forces and thereby reduce the effective force being transmitted to the shaft 16.

In view of the foregoing, it is quite clear that we have provided a foot lever construction having controlled flexibility, which lever incorporates a unique arrangement for insuring controlled flexibility of the lever structure and provides for substantial structural rigidity of the lever structure in the area of its connection with an operating shaft. Additionally, the lever structure of the present invention is provided with a swept back free extremity, defining a cam surface that provides reaction against objects struck by the lever during movement of a motorcycle or other mechanical device to which the lever is connected and which serves to modify force vectors applied to the lever structure and protect the lever shaft from being damaged by excessive application of forces thereto. Additionally, the lever structure of the present invention incorporates a portion that is formed of yieldable material and is designed to be controllably yieldable to prevent excessive torque forces from being applied to the rotatable shaft to which it is connected. It is quite apparent, therefore, that the present invention is one well adapted to attain all of the objects and advantages hereinabove set forth together with other objects and advantages that will become apparent from the description of the apparatus itself. It will be understood that certain combinations and subcombinations are of utility and may be employed without reference to other features and subcombinations. This is contemplated by and is within the scope of the present invention.

As many possible embodiments may be made of this invention without departing from the spirit and scope thereof, it is to be understood that all matters hereinabove set forth or shown in the accompanying drawings are to be interpreted as illustrative and not in a limiting sense.

What is claimed is:

1. A controllably yieldable foot lever for motorcycles and other mechanical devices which will yield in controllable manner in the event of impact with an object to prevent excessive forces from being transmitted to a lever shaft to which the lever may be connected and which is controllably yieldable to prevent the transmission of excessive torque forces to said lever shaft, said foot lever comprising:
   a body of yieldable material formed in the configuration of a foot lever and defining a free extremity and a shaft connection extremity of said lever extending in transverse relation to said shaft connection extremity;
   an insert of substantially rigid material and of non-cylindrical external configuration being intimately retained within said body of yieldable material at said shaft connection extremity, said insert being formed to be received in substantially immovable assembly with said lever shaft;
   shaft receiving means being formed within said insert;
   locking means being received by said insert and being adapted to establish locking engagement between said insert and said shaft; and
   an elongated structural element extending from said insert and being molded within said body of yieldable material, said elongated structural element extending within said body at least partially along the length of said body and terminating short of the free extremity of said lever and causing said lever to be more rigid in the vicinity of said shaft connection extremity than at said free extremity thereof.

2. A controllably yieldable foot shaft as recited in claim 1, wherein:
   said elongated structural element is formed to define an internal configuration establishing a non-rotatable relation with said non-circular external configuration of said insert.

3. A controllably yieldable foot shaft as recited in claim 1, wherein:
   said elongated structural element is formed to define an internal configuration having mating receiving engagement about said non-circular external configuration of said insert; and
   said body of yieldable material is molded at least partially about said insert and structural element.

4. A controllably yielding foot shaft as recited in claim 1, wherein:
   said free extremity of said lever includes means for vectoring impact forces applied thereto upon striking an object which vectoring substantially reduces the forces that would otherwise be imparted to said shaft by said impact.

5. A controllably yieldable foot lever as recited in claim 4, wherein:

said means for vectoring said impact forces comprises cam surface means being defined on the free extremity of said lever and being disposed in inclined relation with the axis of said lever shaft.

6. A controllably yieldable foot lever as recited in claim 4, wherein:
the free extremity of said foot lever is reverse bent configuration, said free extremity being disposed in non-parallel and non-perpendicular relation with the axis of said lever shaft; and
cam surface means is defined by the forward portion of said reverse bent free extremity of said lever shaft, said cam surface means being also disposed in non-parallel and non-perpendicular relation with the axis of said lever shaft.

7. A controllably yieldable foot lever as recited in claim 6, wherein:
said reverse bent portion of said lever reduces in cross section toward the free extremity and is yieldable upon application of forces thereto by the operator of said lever.

8. A controllably yieldable foot lever as recited in claim 1, wherein:
said elongated structural element is formed integrally with said insert.

9. A controllably yieldable foot lever as recited in claim 1, wherein:
aperture means is formed in said insert in communication with said shaft receiving means;
second insert means is supported by said body of yieldable material, said second insert means being formed to receive locking means; and
locking means is received by said second insert means and is adapted for locking engagement with said lever shaft.

10. A controllably yieldable foot lever as recited in claim 1, wherein:
said elongated structural element is formed to define an internal configuration having mating receiving engagement about said non-circular external configuration of said insert;
said body of yieldable material is molded about the assembled insert and structural element;
the free extremity of said foot lever is reverse bent configuration, said reverse bent free extremity being disposed in non-parallel and non-perpendicular relation with the axis of said lever shaft; and
cam surface means is defined by the forward portion of said reverse bent free extremity of said lever shaft, said cam surface means being also disposed in non-parallel and non-perpendicular relation with the axis of said lever shaft.

11. A yieldable foot lever for attachment to the operating shafts of motorcycles and the like said foot lever comprising:
an elongated body formed of flexible material, said body defining a shaft engaging extremity and a free extremity, said shaft engaging extremity of said lever being adapted to receive the extremity of said operating shaft;
means supported by said elongated body for establishing locking engagement with said operating shaft; and
means provided at said free extremity of said elongated body for vectoring impact forces applied thereto upon striking an object, which vectoring substantially reduces the forces that would otherwise be imparted to said shaft by said impact.

12. A yieldable foot lever as recited in claim 9, wherein:
said means for vectoring said impact forces comprises cam surface means being formed on the free extremity of said lever and being disposed in inclined relation with the axis of said lever shaft.

13. A yieldable foot lever as recited in claim 9, wherein:
said free extremity of said foot lever is reverse bent configuration, said free extremity being disposed in non-parallel and non-perpendicular relation with the axis of said lever shaft; and
cam surface means is defined by the forward portion of said reverse bent free extremity of said lever shaft, said cam surface means being also disposed in non-parallel and non-perpendicular relation with the axis of said lever shaft and changing the direction of a force being applied to said lever upon impact with an object from a direction substantially perpendicular to said lever shaft to a direction that is inclined with respect to said shaft.

14. A yieldable foot lever as recited in claim 9, wherein:
said reverse bent portion of said lever reduces in cross-sectional configuration toward the free extremity thereof and is yieldable upon application of forces thereto by the operator of said lever.

* * * * *